June 28, 1932.   K. SLIDELL   1,864,769

KILN FOR THE MANUFACTURE OF BLOATED CLAY PRODUCTS

Filed Nov. 27, 1929   2 Sheets-Sheet 1

June 28, 1932. K. SLIDELL 1,864,769
KILN FOR THE MANUFACTURE OF BLOATED CLAY PRODUCTS
Filed Nov. 27, 1929 2 Sheets-Sheet 2

Witness
William P. Kilroy

Inventor
Kemper Slidell
By
Atty

Patented June 28, 1932

1,864,769

UNITED STATES PATENT OFFICE

KEMPER SLIDELL, OF MADISON, WISCONSIN, ASSIGNOR, BY MESNE ASSIGNMENTS, TO AMERICAN FACE BRICK RESEARCH CORPORATION, A CORPORATION OF ILLINOIS

KILN FOR THE MANUFACTURE OF BLOATED CLAY PRODUCTS

Application filed November 27, 1929. Serial No. 410,037.

This invention relates to improvements in kilns for the manufacture of bloated clay products.

The kiln of the present invention is designed especially for use in the production of building units composed of bloated clay or other argillaceous material, as set forth and described in co-pending application, Serial No. 382,358, filed July 31, 1929, cellular building material.

In the manufacture of such product in accordance with the principles of the present invention, it is necessary to feed the raw material to a conveyor which carries the granular material to a heat zone maintained at a temperature to first cause the searing over of the material and thereafter to cause a bloating of the mass due to the evolution of gases, with the result that the bloated material possesses a cellular structure caused by the expansion of gas within the fused and plastic mass.

In the commercial production of such material in accordance with the specific details of the present invention, it is desirable to provide molds or forms which may be carried by or integrally formed upon the endless conveyor, and which are positioned to receive uniform charges of granular material which is thereafter carried into and through the heat zone and bloated within the molds or forms, so that each of the charges will expand to the desired dimensions required in the formation of a building block, after which the bloated blocks are carried into an annealing chamber and discharged from the molds, and ultimately delivered onto a conveyor which carries them to the point of discharge.

The specific details of the present invention relates to the means provided for feeding measured charges of granular material into the continuously advancing molds or forms; to the construction of the molds and the means for mounting and moving the same; to the means provided for leveling down the granular charges in each of the molds prior to the bloating operation; to the means for discharging the bloated blocks from the molds and delivering them in free condition upon the conveyor which carries them to the point of discharge; to the means for feeding a parting material to prevent adherence of the bloating material to the surfaces of the molds; to the means for leveling down the exposed surfaces of the blocks after bloating; and to the various other details of construction as well as to the general structure of the kiln as a whole.

Further objects and details will appear from a description of the invention in conjunction with the accompanying drawings wherein,—

Figure 1:
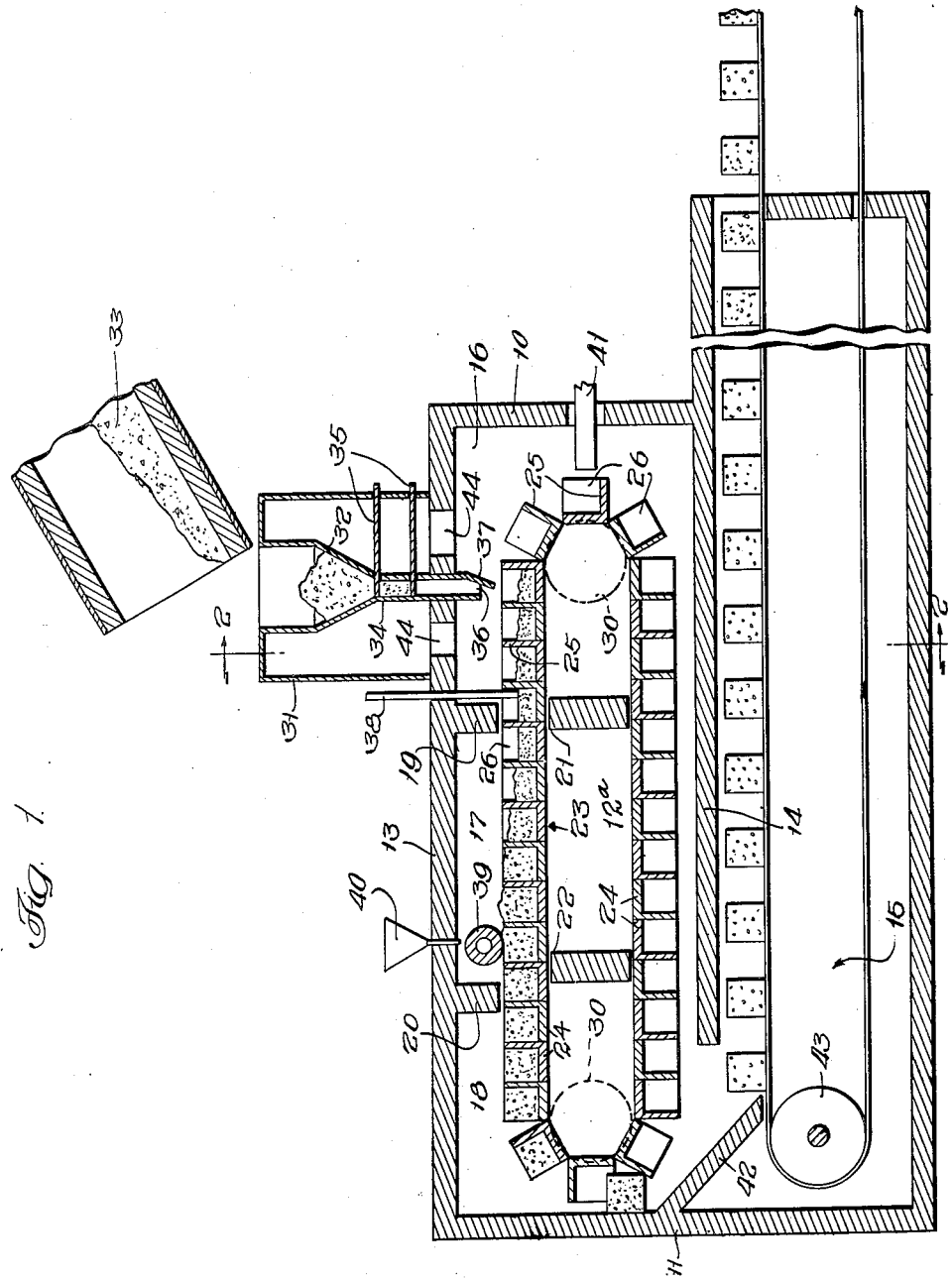
Figure 1 is a longitudinal sectional elevation of the kiln.
Figure 2:
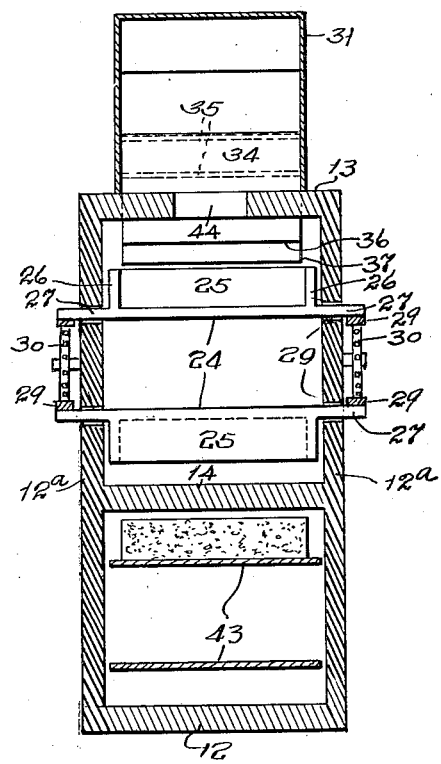
Fig. 2 is a cross section thereof, taken on line 2—2 of Fig. 1.
Figure 3:
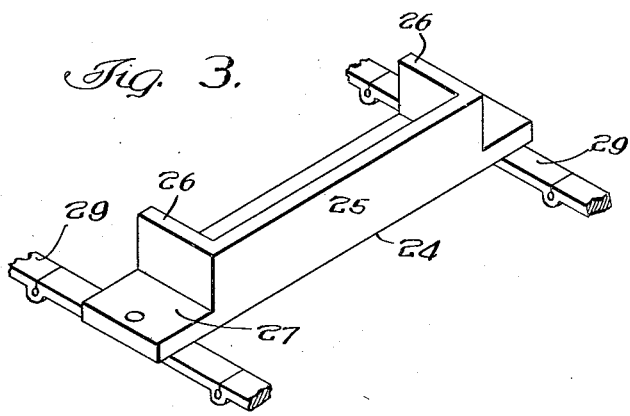
Fig. 3 is an enlarged perspective view of one of the mold sections of the endless conveyor.

The kiln as shown is of generally rectangular formation, comprising a front end wall 10, a rear end wall 11, a floor 12, sides 12ᵃ and a roof 13. The kiln is divided into upper and lower portions by the provision of a horizontal partition wall 14, which divides the structure into a lower cooling chamber 15 and an upper portion comprising a charging chamber 16, a bloating chamber 17, and an annealing chamber 18.

The charging chamber is separated from the bloating chamber by a cross wall 19, and the bloating chamber is separated from the annealing chamber by a cross wall 20. The walls 19 and 20 are provided with apertures 21 and 22 respectively, and both of these cross walls terminate above the partition wall 14, which arrangement provides space for the movement of the endless conveyor 23.

The endless conveyor is made up of sections 24 constituting molds for the reception of the charges of granular material, and each mold section is in the form of a flat base plate having a side wall 25 and end walls 26—26, which arrangement provides an enclosure around three sides, the fourth side being open, so that when the mold section stands in associated relation with the adjacent mold section of the conveyor, the side wall 25 of the adjacent mold section will furnish an enclosure around the fourth side of the mold, so that the charge of granular material will be retained during the passage of the upper run of the conveyor through the charging chamber, the bloating chamber, and the annealing chamber.

The end walls 26 of the mold sections are located some distance inwardly from the ends 27 of the molds, which ends preferably project outwardly through slots or openings in the side walls 12ᵃ of the kiln, and connect with exteriorly positioned endless chain conveyors 29 aligned and supplemented upon tracks 29ᵃ and driven by sprockets 30 or the like, which arrangement is desirable in that it relieves the chains or other actuating mechanism from the extreme heat maintained within the interior of the kiln. The forward sprockets are power driven, which imparts a thrust to the upper run of the conveyor, thereby tending to hold the sections 24 closely together on the upper run, which is desirable in order to hold the walls of the molds in close relation to afford an adequate enclosure and to prevent escape of material.

Above the charging chamber is located a boxlike superstructure 31, within which is located a chute 32 positioned to receive granular argillaceous material from a preheater 33, which is preferably in the form of a rotary kiln, and is heated to a temperature slightly below the fusing point of the granular material, which in ordinary practice will lie somewhere within the range of temperature between 1500° and 1800° F.

The preheated granular material delivered into the hopper 32 passes downwardly through a throat 34 provided with slide valves 35 or the like adapted to measure off equal charges of granular material. The material is ultimately discharged through a mouth 36, at which point the rear wall 37 of the hopper throat is slanted or inclined to discharge the material inwardly against the leading side wall of the mold presented to receive the charge. A short distance to the rear of the chute and within the charging chamber is located a reciprocating plate 38, which is adapted to level down each of the charges, so that before the bloating begins, each of the molds will be charged with a layer of granular material of uniform depth.

At the rear end of the bloating chamber 17 is located a leveling roller 39, the acting surface of which lies level with the edges of the molds, which roller is provided to level down the upper or exposed surface of the bloated block while still in a fused or plastic condition. In order to prevent adherence of the bloated material to the roller 39, a hopper 40 is provided which discharges a parting material, such as powdered graphite, talc, sand or the like, onto the surface of the roller, and in order to prevent sticking of the material to the interior surfaces of the mold sections, a pipe or tube 41 extends through the forward end wall 10 of the kiln in position to blow a parting material of the character described into and against the interior surfaces of the mold, to provide a coating thereon before the granular material is charged into the mold.

The end wall 11 is provided with an inwardly extending incline 42 which lies immediately beneath the rear end of the endless conveyor at the point where the mold sections are overturned in passing from the upper run of the conveyor to the lower run, and this incline receives the blocks of bloated material as they are discharged from the mold sections by the opening and upturning of the sections in passing around the end turn of the conveyor.

The incline 42 delivers the blocks to a point below the level of the partition wall 14, at which point the blocks fall upon the upper turn of the endless conveyor 43, which carries them forwardly through the cooling chamber 15, and ultimately discharges them at the point of delivery.

Although, as shown, the cooling chamber and the conveyor 43 are arranged in such a way as to carry the blocks in a forward direction, it is obvious that the structure might be reversed and the completely bloated blocks carried through a cooling chamber extending rearwardly rather than forwardly.

As shown, the superstructure 31 around the hopper 32 is in communication with the charging chamber through apertures 44, which permit the hot gases to pass up from the charging chamber and into the space around the hopper 32, in order to maintain the granular material at the preheating temperature at which the granular material is delivered from the preheater.

It is desirable to maintain the bloating chamber 17 at a temperature of from 2000° to 2300° F., and the annealing chamber and charging chambers at somewhat lower temperatures, while the cooling chamber is maintained at a considerably lower temperature and is of sufficient length to permit completed blocks to be cooled down to handling temperature before they are finally discharged from the kiln.

In operation, the granular material will be preheated in the rotary kiln and under conditions of agitation up to a point slightly below the fusing point and discharged in granular form into the hopper, from which measured charges will be delivered through the throat or spout and into the respective molds or forms which open upwardly to receive the charges.

At the charging point, it will be observed that the mold sections stand in closely adjacent relation to one another, so that the three mold walls of one section, in conjunction with the adjacent wall of the preceding mold section, constitute a mold for the reception of a charge of material.

The endless conveyor may be moved continuously at a slow rate of speed, or may be moved intermittently, but in either case a uniform charge of granular material will be delivered into each of the molds during the interval of its adjacency to the lower end of the spout. Thereafter, as the endless conveyor moves rearwardly, the reciprocating plate 38 will be dropped downwardly into each of the molds in turn to level off the charge therein contained, before the material begins to bloat.

As the molds enter the bloating chamber, each of the charges will be subjected to a bloating temperature, which first causes the formation of a surface skin or sheath, over and around the charge, which seals the interior of the mass against the escape of gases, so that, as the heat penetrates into the interior of the mass, the gas forming constituents will cause an evolution of gases within the fused and somewhat plastic mass, thereby bloating and expanding the charge of material within the mold, and causing the formation of minute cells or cavities separated from one another by cell walls of vitreous material.

During the period of time allotted to the passage of the molds through the bloating chamber, the respective charges are regulated in definite quantity, so that by proper regulation of time and temperature, the contents of each mold will be bloated to the level of the upper surface to give predetermined density to the blocks, but in order to compensate for any protrusion which may occur above the level of the molds, the bloated blocks are successively brought under the leveling roller 39, which smooths down any protuberance immediately before the blocks pass out of the bloating chamber and into the cooler annealing chamber, where they set and harden.

Within the annealing chamber, a considerably lower temperature is encountered, which causes the fused material to harden within the mold, so that before each block reaches the point of discharge it will be sufficiently hard to retain the rectangular or other shape imparted to it by the mold. As the upper turn of the conveyor reaches the point where it is carried around by the adjacent sprocket 30, the molds will partially open up and separate, and will be overturned or reversed in position, so that the bloated blocks will be released and discharged and be gradually carried down the incline 42 and onto the surface of the conveyor 43.

It will be observed that the mold sections pass in such close relation to the incline that the released blocks of material will be held and supported as they pass onto and down the incline, so that they will not be violently discharged or freely slide down the incline, which tends to prevent chipping or breaking during this stage of the operation and until they have become cooled and thoroughly toughened by passage through the cooling chamber, which may be of any length required to afford a sufficient cooling period under conditions of gradually decreasing temperature, which is desirable to prevent internal fracturing due to sudden lowering of temperature.

The kiln of the present invention is one which is designed to continuously carry forward the material through the successive stages in the formation of the bloated blocks, and to secure uniformity in size and shape by bloating each of the charges within its own individual mold, in which respect the specific process and apparatus of the present invention differ from others in which a continuous column of bloated material is evolved and delivered and afterwards cut up into sections of the desired size and shape, after the bloating and annealing stages in the operation are completed.

Although the present invention has been described with particularity as to detail, it is not the intention to limit the invention to the precise mechanism shown, save as indicated in the claims; nor is it the intention to limit the invention strictly to a mechanism or process in which the bloating is performed in molds, since in its broader aspect the invention also embraces the generic idea of feeding granular material to a moving conveyor upon the surface of which it is carried through the bloating zone, whether in molds or in the form of a layer, continuous or otherwise.

I claim:

1. In a kiln of the class described, the combination of a bloating chamber, an endless conveyor consisting of connected sections provided with walls constituting molds, means for moving one of the runs of said endless conveyor through the bloating chamber, and means for charging granular material into said molds when brought into adjacent relation to said charging means, a cooling chamber underneath the bloating chamber, and a conveyor movable through said cooling chamber and positioned to receive blocks of bloated material when discharged from the molds.

2. In a kiln of the class described, the combination of a bloating chamber and an annealing chamber, an endless conveyor consisting of connected sections provided with walls constituting molds, means for moving one of the runs of said endless conveyor through the bloating chamber and through the annealing chamber, and means for charging granular material into said molds when brought into adjacent relation to said charging means, a cooling chamber underneath the bloating chamber, and a conveyor movable through said cooling chamber and positioned to receive blocks of bloated material when discharged from the molds.

3. In a kiln of the class described, the combination of a bloating chamber adapted to be heated to a temperature adequate to cause bloating of granular earthy material, an endless conveyor consisting of sections linked together in endless relation, the upper run of said conveyor extending through said bloating chamber, means for imparting circuit travel to said endless conveyor, each of the conveyor sections being provided with end walls and a side wall, and the sections of the upper run when traveling through the bloating chamber being aligned to bring the walls of adjacent sections into coacting relation to furnish separated molds adapted to open up when the sections are brought into angular relation as the sections pass out of the aligned relation of the upper run, and means for charging granular material into said molds as the molds are successively brought into adjacent relation to said charging means, and means for leveling down the granular charges deposited within the respective molds, and means for leveling down the charges after bloating to the level of the molds.

4. In a kiln of the class described, the combination of a bloating chamber adapted to be heated to a temperature adequate to cause bloating of granular earthy material, an endless conveyor consisting of sections linked together in endless relation, the upper run of said conveyor extending through said bloating chamber, means for imparting circuit travel to said endless conveyor, each of the conveyor sections being provided with end walls and a side wall, and the sections of the upper run when traveling through the bloating chamber being aligned to bring the walls of adjacent sections into coacting relation to furnish separated molds adapted to open up when the sections are brought into angular relation as the sections pass out of the aligned relation of the upper run, means for charging granular material into said molds as the molds are successively brought into adjacent relation to said charging means, and a delivery conveyor located underneath the mold-forming conveyor and positioned to receive blocks of bloated material released from the molds when opened.

5. In a kiln of the class described, the combination of a bloating chamber adapted to be heated to a temperature adequate to cause bloating of granular earthy material, an endless conveyor consisting of sections linked together in endless relation, the upper run of said conveyor extending through said bloating chamber, means for imparting circuit travel to said endless conveyor, each of the conveyor sections being provided with end walls and a side wall, and the sections of the upper run when traveling through the bloating chamber being aligned to bring the walls of adjacent sections into coacting relation to furnish separated molds adapted to open up when the sections are brought into angular relation as the sections pass out of the aligned relation of the upper run, means for charging granular material into said molds as the molds are successively brought into adjacent relation to said charging means, and means for leveling down the granular charges deposited within the respective molds, and a delivery conveyor located underneath the mold-forming conveyor and positioned to receive blocks of bloated material released from the molds when opened and convey them in a direction opposite to the line of travel of the molds through the bloating chamber.

6. In a kiln of the class described, the combination of a bloating chamber adapted to be heated to a temperature adequate to cause bloating of granular earthy material, an endless conveyor consisting of sections linked together in endless relation, the upper run of said conveyor extending through said bloating chamber, means for imparting circuit travel to said endless conveyor, each of the conveyor sections being provided with end walls and a side wall, and the sections of the upper run when traveling through the bloating chamber being aligned to bring the walls of adjacent sections into coacting relation to furnish separated molds adapted to open up when the sections are brought into angular relation as the sections pass out of the aligned relation of the upper run, and means for charging granular material into said molds as the molds are successively brought into adjacent relation to said charging means, means for leveling down the granular charges deposited within the respective molds, means for leveling down the charges after bloating to the level of the molds, and a delivery conveyor located underneath the mold-forming conveyor and positioned to receive blocks of bloated material released from the molds when opened.

7. In a kiln of the class described, the combination of a charging member and a bloating chamber adapted to be heated to a temperature adequate to cause bloating of granular earthy material, an endless conveyor consisting of sections linked together in endless relation, the upper run of said conveyor being located within and extending through said bloating chamber, means for imparting circuit travel to said endless conveyor, each of the conveyor sections being provided with end walls and a side wall, and the sections of the upper run when traveling through the bloating chamber being aligned to bring the walls of adjacent sections into coacting relation to furnish separated molds adapted to open up when the sections are brought into angular relation as the sections pass out of the aligned relation of the upper run, means contiguous to said charging chamber for charging granular material into said molds as the molds are successively brought into adjacent relation to said charging means, and means suitably located for discharging a parting medium into each mold prior to its arrival at the charging point.

8. In a kiln of the class described, the combination of a bloating chamber adapted to be heated to a temperature adequate to cause bloating of granular earthy material, an endless conveyor consisting of sections linked together in endless relation, the upper run of said conveyor extending through said bloating chamber, means for imparting circuit travel to said endless conveyor, each of the conveyor sections being provided with end walls and a side wall, and the sections of the upper run when traveling through the bloating chamber being aligned to bring the walls of adjacent sections into coacting relation to furnish separated molds adapted to open up when the sections are brought into angular relation as the sections pass out of the aligned relation of the upper run, means for charging granular material into said molds as the molds are successively brought into adjacent relation to said charging means, and means located for discharging a parting medium into each mold prior to its arrival at the charging point, roller means positioned to level down the blocks of bloated material to the level of the molds after bloating.

9. In a kiln of the class described, partition walls dividing the kiln into a charging chamber, a bloating chamber and an annealing chamber on an upper level, and a cooling chamber on a lower level, an endless conveyor consisting of sections linked together and mounted to bring the upper sections into aligned relation within the charging chamber and into the annealing chamber, means for imparting circuit travel to said endless conveyor, each of the conveyor sections having walls around three sides and adapted to combine with the contiguous wall of the next adjacent section to furnish a series of separated receptacles constituting molds adapted to open up for the discharge of blocks of bloated material when the sections are brought into angular relation after passing beyond the upper run of the conveyor, means for charging measured quantities of granular material into the successive molds when brought into adjacency with the charging means, and a discharging conveyor located below the mold-forming conveyor and within the cooling chamber and adapted to receive blocks of bloated material discharged from the molds and to convey them to the point of delivery.

10. In a kiln of the class described, partition walls dividing the kiln into a charging chamber, a bloating chamber and an annealing chamber on an upper level, and a cooling chamber on a lower level, an endless conveyor consisting of sections linked together and mounted to bring the upper sections into aligned relation within the charging chamber and through the bloating chamber and into the annealing chamber, means for imparting circuit travel to said endless conveyor, each of the conveyor sections having walls around three sides and adapted to combine with the contiguous wall of the next adjacent section to furnish a series of separated receptacles constituting molds adapted to open up for the discharge of blocks of bloated material when the sections are brought into angular relation after passing beyond the upper run of the conveyor, means for charging measured quantities of granular material into the successive molds when brought into adjacency with the charging means, and a discharging conveyor located below the mold-forming conveyor and within the cooling chamber and adapted to receive blocks of bloated material discharged from the molds and to convey them to the point of delivery, and an incline located in intermediate relation between the delivery end of the mold-forming conveyor and the receiving end of the discharging conveyor.

11. In a kiln of the class described, a horizontal partition wall dividing the kiln into an upper portion and a lower portion, the upper portion being sub-divided longitudinally thereof into a forward charging chamber, an intermediate bloating chamber, and a rear annealing chamber, and the lower portion constituting a cooling chamber, an endless conveyor located wholly above the horizontal partition wall and consisting of sections linked together and mounted to bring the upper sections into aligned relation, first within the charging chamber, second within the bloating chamber, and finally within the annealing chamber, during the travel of the upper turn of the conveyor, means for imparting circuit travel to said conveyor, each of the conveyor sections constituting molds for the reception of granular material, means entered into the charging chamber and above the upper turn of the conveyor for discharging said granular material successively into the molds preliminary to the movement thereof into the bloating chamber, means within the bloating chamber for leveling down the upper surface of the charges bloated within the molds to the level of the molds, and a discharging conveyor located underneath the mold carrying conveyor and within the cooling chamber and adapted to receive blocks of bloated material discharged from the molds and convey them to the point of delivery.

12. In a kiln of the class described, a horizontal partition wall dividing the kiln into an upper portion and a lower portion, the upper portion being sub-divided longitudinally thereof into a forward charging chamber, an intermediate loading chamber, and a rear annealing chamber, and the lower portion constituting a cooling chamber, an endless conveyor located wholly above the horizontal partition wall and consisting of sections linked together and mounted to bring the upper sections into aligned relation, first within the charging chamber, second within the bloating chamber, and finally within the annealing chamber, during the travel of the upper turn of the conveyor, means for imparting circuit travel to said conveyor, each of the conveyor sections constituting molds for the reception of granular material, means entered into the charging chamber and above the upper turn of the conveyor for discharging said granular material successively into the molds preliminary to the movement thereof into the bloating chamber, means within the bloating chamber for leveling down the upper surface of the charges bloated within the molds to the level of the molds, and a discharging conveyor located underneath the mold carrying conveyor and within the cooling chamber and adapted to receive blocks of bloated material discharged from the molds and convey them to the point of delivery, and an incline leading from the annealing chamber to the cooling chamber and adapted to direct the movement of blocks of bloated material from the mold carrying conveyor to the discharging conveyor.

In witness that I claim the foregoing I have hereunto subscribed my name this 13th day of November, 1929.

KEMPER SLIDELL.